(12) United States Patent
Konishi et al.

(10) Patent No.: US 7,087,299 B2
(45) Date of Patent: Aug. 8, 2006

(54) POLYESTER FIBERS AND FALSE TWIST-TEXTURED YARN COMPRISING SAME

(75) Inventors: Masahiro Konishi, Matsuyama (JP); Tsuyoshi Masuda, Matsuyama (JP); Hiroyuki Osaka, Matsuyama (JP); Keijiro Hattori, Tokyo (JP)

(73) Assignee: Teijin Fibers Limited, Osaka (JP)

( * ) Notice: Subject to any disclaimer, the term of this patent is extended or adjusted under 35 U.S.C. 154(b) by 0 days.

(21) Appl. No.: 10/506,539

(22) PCT Filed: Dec. 26, 2003

(86) PCT No.: PCT/JP03/16966

§ 371 (c)(1),
(2), (4) Date: Sep. 3, 2004

(87) PCT Pub. No.: WO2004/063437

PCT Pub. Date: Jul. 29, 2004

(65) Prior Publication Data

US 2005/0106388 A1    May 19, 2005

(30) Foreign Application Priority Data

Jan. 16, 2003  (JP) ............................ 2003-008161
Mar. 14, 2003  (JP) ............................ 2003-070083

(51) Int. Cl.
*D01F 6/00*   (2006.01)
*C08G 63/02*  (2006.01)
*C08G 63/00*  (2006.01)
*C08G 18/42*  (2006.01)

(52) U.S. Cl. .................. 428/364; 428/395; 528/272; 528/287; 528/286; 528/308.6; 524/706

(58) Field of Classification Search ............... 428/364, 428/395; 528/272, 279, 286, 287, 296, 308.6; 524/706, 783
See application file for complete search history.

(56) References Cited

U.S. PATENT DOCUMENTS 4,254,018 A      3/1981  Kowallik et al.
5,331,032 A *    7/1994  Suzuki et al. ............... 524/135
6,593,447 B1 *   7/2003  Yamamoto .................. 528/279

FOREIGN PATENT DOCUMENTS

EP    1156070 A    11/2001
JP    54-43295 A    4/1979
JP    54-45397 A    4/1979

(Continued)

OTHER PUBLICATIONS

Morrison Boyd, Organic Chemistry, p. 1272, 1987.*

Primary Examiner—N. Edwards
(74) Attorney, Agent, or Firm—Sughrue Mion, PLLC (57) ABSTRACT

Polyester fibers having an individual fiber thickness of 0.1 to 10 dtex are produced from a polyester polymer produced by polycondensing an aromatic dicarboxylate ester in the presence of a catalyst including a mixture of a Ti compound component (A) including at least one member selected from titanium alkoxides and reaction products of the titanium alkoxides with a specific type of carboxylic acids or anhydrides thereof, with a specific P compound component (B), and/or a reaction product of a Ti compound component (C) with a specific P compound component (D). The resultant fibers have a good color tone (a low b value) a stable drawing and false-twisting processability and exhibit excellent appearance and performance.

10 Claims, 1 Drawing Sheet

FOREIGN PATENT DOCUMENTS

| | | |
|---|---|---|
| JP | 3043414 B2 | 3/2000 |
| JP | 2000-319370 A | 11/2000 |
| JP | 2001-278971 A | 10/2001 |
| JP | 2003-160655 A | 6/2003 |
| JP | 2003-160656 A | 6/2003 |
| JP | 2003-293222 A | 10/2003 |
| WO | WO 92/13119 A1 | 8/1992 |

* cited by examiner

Fig.1

POLYESTER FIBERS AND FALSE TWIST-TEXTURED YARN COMPRISING SAME

TECHNICAL FIELD

The present invention relates to polyester fibers and a false twist-textured yarn comprising the same. More particularly, the present invention relates to polyester fibers having a good color tone and an excellent false twist-texturing property and a false twist-textured yarn comprising the same.

BACKGROUND ART

Currently, woven or knitted fabrics comprising low thickness polyester fibers having a thickness of 1 dtex or less and various textile products produced from the polyester fibers are becoming widely used due to the soft and suede-like hand thereof. Also, polyester false twist-textured filament yarns produced by false twist-texturing the above-mentioned low thickness polyester filaments are becoming widely used as materials for interior and interior finish and seats of automobiles, due to not only a soft hand but also a high warm-keeping property, water-absorption and moisture-absorption of the fabrics made from the false twist-textured yarns. The low thickness polyester fibers as mentioned above are difficult to produce and therefore various improvements on the fiber-producing process have been provided in, for example, Japanese Patent No. 3,043,414.

In the conventional melt-spinning process of a polyester polymer, however, a phenomenon occurs such that a foreign matter is generated, adhered and accumulated around the melt-extruding holes of a melt spinneret, with the lapse of the melt-spinning time, the accumulated foreign matter hinders the normal flow of the extruded melt to cause the filamentary streams of the extruded melt to bend, swing or whirl (which may be referred to as irregular extrude phenomena hereinafter), and then finally, the filamentary streams of the extruded melt comes into contact with the accumulated foreign matter and then are broken. The above-mentioned foreign matter may be referred to as a spinneret foreign matter.

Particularly, when polyester fibers having a small individual fiber thickness of 1 dtex or less are produced by a melt-spinning procedure and then taken up, the spinneret foreign matter imparts a serious influence on the extrusion conditions of the polymer melt and within a short time, the irregular extrusion phenomena occur to cause the generation of fluffs on the fibers, the breakage of the fibers to be promoted and the continuous proceeding of the melt-spinning to become difficult. Also, the above-mentioned irregular phenomena cause, in the step of cooling and solidifying of the filamentary streams of the polymer melt, the filamentary polymer melt streams to get an uneven fibrous structure, the resultant polyester fibers thus also having an uneven inner structure. Thus, when the resultant fiber yarn is subjected to a draw and false twist texturing procedure, the uneven inner structure causes the generation of fluffs and the breakages of the yarn to frequently occur.

It is known that the generation and accumulation of the spinneret foreign matter are derived from antimony remaining in the polyester polymer. The antimony is derived from a polycondensation catalyst for the production of the polyester polymer. The antimony-containing catalyst has an excellent polycondensation-promoting property for the production of polyesters, particularly polyethylene terephthalate polymer and the resultant polyester fibers have a good color tone, and therefore, the antimony-containing catalyst is currently most widely employed in practice and thus antimony is widely contained in the conventional polyester fibers.

Alternately, as a polycondensation catalyst for the polyester polymers other than the antimony compounds, titanium compounds, for example, titanium butoxide, are known. When the titanium compound is used, a problem occurs such that the resultant polyester polymer has a yellowish color tone and thus the resultant polyester fibers are not appropriate to use for cloths due to the yellowish color tone, while the generation and accumulation of the foreign matter around the spinneret are decreased.

DISCLOSURE OF THE INVENTION

An object of the present invention to provide polyester fibers having a good color tone and an excellent false twist-texturing property and a false twist-textured yarn comprising the polyester fibers and having no or substantially no fluffs and thus a high quality. In the present invention, the above-mentioned problems of the conventional polyester fibers and false twist-textured yarn comprising the same, are solved.

The above-mentioned object can be attained by the polyester fibers and false twist-textured yarn of the present invention.

The polyester fibers of the present invention comprises, as a principal component, a polyester polymer and having an individual fiber thickness of 0.1 to 1.0 dtex, wherein the polyester polymer is one produced by polycondensing an aromatic dicarboxylate ester in the presence of a catalyst, the catalyst comprises at least one member selected from the mixtures (1) and reaction products (2) as specified below, the mixture (1) for the catalyst comprises

(A) a titanium compound component comprising at least one member selected from the group consisting of:

(a) titanium alkoxides represented by the general formula (I):

in which formula (I), $R^1$, $R^1$, $R^3$ and $R^4$ respectively and independently from each other represent a member selected from alkyl groups having 1 to 20 carbon atoms and a phenyl group, m represent an integer of 1 to 4, and when m represents an integer of 2, 3 or 4, the 2, 3 or 4 $R^2$s and $R^3$s may be respectively the same as each other or different from each other, and (b) reaction products of the titanium alkoxides of the general formula (I) with aromatic polycarboxylic acids represented by the formula (II):

in which formula (II), n represents an integer of 2 to 4, or anhydrides of the acids of the formula (II), and mixed with (B) a phosphorus compound component comprising at least one phosphorus compound represented by the general formula (III):

in which formula (III), $R^5$, $R^6$ and $R^7$ respectively and independently from each other represent an alkyl group having 1 to 4 carbon atoms, X represents a member selected from a —$CH_2$— group and a —CH(Y)— group (wherein Y represents a phenyl group), the mixture (1) for the catalyst for the polycondensation being employed in an amount satisfying the requirements represented by the following expressions of relation (i) and (ii):

$$1 \leq M_P/M_{Ti} \leq 15 \quad \text{(i)}$$

and $$10 \leq M_P + M_{Ti} \leq 100 \quad \text{(ii)}$$

wherein $M_{Ti}$ represents a ratio in % of a value in milli mole of titanium element contained in the titanium compound component (A) to a value in mole of the aromatic dicarboxylate ester, and $M_P$ represents a ratio in % of a value in milli mole of phosphorus element contained in the phosphorus compound component (A) to the value in mole of the aromatic dicarboxylate ester; and the reaction products (2) for the catalyst comprises (C) a titanium compound component comprising at least one member selected from the group consisting of:

(c) titanium alkoxides represented by the general formula (I) and (d) reaction products of the titanium alkoxides of the general formula (I) with aromatic polycarboxylic acids represented by the above-mentioned general formula (II) or anhydride of the acids; and reacted with (D) a phosphorus compound component comprising at least one phorous compound represented by the general formula (IV):

in which formula (IV), $R^8$ represents an alkyl group having 1 to 20 carbon atoms or an aryl group having 6 to 20 carbon atoms, and p represents an integer of 1 or 2.

In the polyester fibers of the present invention, in each of the component (A) of the mixture (1) and the component (C) of the reaction products (2) for the catalyst, a reaction molar ratio of each of titanium alkoxides (a) and (c) to the aromatic polycarboxylic acid of the general formula (II) or the anhydride thereof is preferably in the range of from 2:1 to 2:5.

In the polyester fibers of the present invention, in the reaction product (2) for the catalyst, a reaction amount ratio of the component (D) to the component (C) is preferably in the range of, in terms of ratio (P/Ti) of the molar amount of phosphorus atoms contained in the component (D) to the molar amount of titanium atoms contained in the component (C), from 1:1 to 3:1.

In the polyester fibers of the present invention, the phosphorus compound of the general formula (IV) for the reaction product (2) is preferably selected from monoalkyl phosphates.

In the polyester fibers of the present invention, the dialkyl aromatic dicarboxylate ester is preferably one produced by a transesterification reaction of a dialkyl ester of an aromatic dicarboxylic acid with an alkylene glycol in the presence of a titanium-containing catalyst.

In the polyester fibers of the present invention, the aromatic dicarboxylic acid is preferably selected from terephthalic acid, 1,2-naphthalene dicarboxylic acid, phthalic acid, isophthalic acid, diphenyldicarboxylic acid and diphenoxyethane dicarboxylic acid; and the alkylene glycol is preferably selected from ethylene glycol, butylene glycol, trimethylene glycol, propylene glycol, neopentyl glycol, hexamethylene glycol and dodecamethylene glycol.

In the polyester fibers of the present invention, the polyester polymer is preferably selected from polyethylene terephthalate, polytrimethylene terephthalate and polytetramethylene terephthalate.

In the polyester fibers of the present invention, the polyester polymer preferably has an intrinsic viscosity of 0.45 to 0.70, determined from a solution in orthochlorophenol at a temperature of 35° C.

The false twist-textured yarn of the present invention comprises the polyester fibers as defined in the present invention.

In the false twist-textured yarn of the present invention, a difference between a L* value and a b* value of the false twist-textured polyester fiber yarn is preferably in the range of from 91.0 to 99.0.

BEST MODE FOR CARRYING OUT THE INVENTION

The polyester fibers of the present invention comprises, as a principal component, a polyester polymer and have an individual fiber thickness of 0.1 to 1.0 dtex.

The polyester polymer is one produced by polycondensing an aromatic dicarboxylate ester in the presence of a specific catalyst.

The polyester fibers of the present invention are preferably produced by melt-spinning the polyester polymer and taking up at a taking-up speed (spinning speed) of 2500 to 4000 m/min; more preferably 2500 to 3500 m/min. Optionally, the melt-spin fibers are drawn and heat-treated after the melt-spinning procedure. The polyester multifilament yarn produced at the high taking-up speed as mentioned above may be directly subjected to a false twist-texturing procedure (which may contain a drawing and/or a heat treatment) to provide a false twist-textured yarn.

In the present invention, the catalyst for producing the above-mentioned polyester polymer comprises at least one member selected from the mixtures (1) and reaction products (2) for the catalyst, which will be explained below.

The mixtures (1) for the catalyst are mixtures of a titanium compound component (A) with a phosphorus compound component (B). The titanium compound component (A) comprises at least one compound selected from the group consisting of (a) titanium alkoxides represented by the general formula (I) and (b) reaction products of the titanium alkoxides of the general formula (I) with aromatic polycarboxylic acids represented by the general formula (II) or anhydrides thereof.

In the present invention, the titanium alkoxide (a) and (b), from which the titanium compound component (A) for the catalyst mixture (1) is constituted, respectively have a high solubility in or a high affinity to the polyester polymer produced by the catalytic polycondensation reaction, and thus the titanium compounds (a) and (b) contained in the polyester polymer do not deposit, adhere and accumulate around the spinneret during the melt-spinning procedure and thus do not cause the resultant polyester fibers to exhibit a low quality and to be broken.

In the titanium alkoxides represented by the general formula (I), $R^1$, $R^2$, $R^3$ and $R^4$ respectively represent an alkyl group or a phenyl group, preferably an alkyl group. The alkyl group preferably has 1 to 20 carbon atoms, more preferably 1 to 6 carbon atoms. Also, in the formula (I), m represents an integer of 1 to 4, preferably of 1 to 3. When m represents an integer of 2, 3 or 4, the two, three or four $R^2$ and $R^3$ may be respectively the same as each other or different from each other.

In the general formula (II), n represents an integer of 2 to 4, preferably 3 or 4.

In the mixtures (1) for the polycondensation catalyst, the phosphorus compound component (B) comprises at least one compound represented by the general formula (III):

in which formula (III), $R^5$, $R^6$ and $R^7$ respectively and independently from each other represent a member selected from alkyl groups having 1 to 4 carbon atoms, X represents a member selected from a —$CH_2$— group and a —CH(Y)— group (in which Y represents a phenyl group).

The reaction products (2) for the polycondensation catalyst are reaction products of a titanium compound component (C) with a phosphorus compound component (D).

The titanium compound component (C) comprises at least one compound selected from the group consisting of:
(a) titanium alkoxides represented by the above-mentioned general formula (I), and
(b) reaction products of the titanium alkoxides of the general formula (I) with aromatic polycarboxylic acids represented by the general formula (II) or anhydrides thereof.

The phosphorus compound component (D) comprises at least one phosphorus compounds represented by the general formula (IV):

in which formula (IV), $R^8$ represents an alkyl group having 1 to 20 carbon atoms or an aryl group having 6 to 20 carbon atoms, and p represents an integer of 1 or 2.

The reaction products (2) for the catalyst usable for the present invention exhibit a practically sufficient solubility in or affinity to the polyester polymer due to the high solubility of the titanium compound component contained in the reaction products (2) in the polyester polymer. The reaction products (2) contained in the polyester polymer do not deposit, adhere and accumulate around the melt-spinneret during the melt-spinning procedure. Therefore, the polyester fibers having a high quality can be obtained.

The titanium alkoxides (a) of the general formula (I) usable for the titanium compound component (A) or (C) for the polycondensation catalyst for the present invention are preferably selected from titanium tetraisopropoxide, titanium tetrapropoxide, titanium tetra-n-butoxide, titanium tetraethoxide, titanium tetraphenoxide, octaalkyl trititanate and hexaalkyl dititanate.

The aromatic polycarboxylic acids of the general formula (II) and anhydrides thereof to be reacted with the titanium alkoxides (a) or (c) are preferably selected from phthalic acid, trimellitic acid, hemimellitic acid, pyrromellitic acid and anhydrides of the above-mentioned acids. Particularly, when trimellitic anhydride is used, the resultant reaction products (b) exhibit a high affinity to the polyester polymer and thus contribute to preventing the accumulation of the foreign matter.

To proceed with the reaction of the titanium alkoxides (a) or (c) for the titanium compound component (A) or (C) with the aromatic polycarboxylic acids of the general formula (II) or the anhydrides thereof, preferably the aromatic polycarboxylic acids or the anhydrides thereof are dissolved in a solvent, the titanium alkoxides (a) or (c) are added dropwise into the solution, and then the resultant reaction mixture is heated at a temperature of 0 to 200° C. for at least 30 minutes. The above-mentioned solvent are preferably selected from ethyl alcohol, ethylene glycol, trimethylene glycol, tetramethylene glycol, benzene and xylene.

There is no limitation to the reaction molar ratio of the titanium alkoxides (a) or (c) to the aromatic polycarboxylic acids of the general formula (II) or the anhydrides thereof. However, if the proportion of the titanium alkoxides is too high, the resultant polyester polymer may exhibit a degraded color tone and/or a decreased softening point. To the contrary, if the proportion of the titanium alkoxides is too low, the polycondensation reaction may hardly proceed. Therefore, the reaction molar ratio of the titanium alkoxides (a) or (c) to the aromatic polycarboxylic acid of the general formula (II) or the anhydrides thereof is preferably controlled in the range of from 2:1 to 2:5.

The reaction products (b) or (d) obtained by the above-mentioned reaction may be employed without refining, or after refining by a recrystallization procedure with acetone, methyl alcohol and/or ethyl acetate.

The phosphorus compounds (phosphonate compounds) of the general formula (III) usable for the phosphorus compound component (B) of the mixture (1) for the polycondensation catalyst for the present invention are preferably selected from esters of phosphonic acid derivatives, for example, dimethyl esters, diethyl esters, dipropylesters and dibutyl esters of carbomethoxymethanephosphonic acid, carboethoxymethanephosphonic acid, carbopropoxymethanephosphonic acid, carbobutoxymethanephosphonic acid, carboxyphenylmethanephosphonic acid, carboethoxyphenylmethanephosphonic acid, carbopropoxyphenylmethanephosphonic acid, and carbobutoxyphenylmethanephosphonic acid.

The employment of the phosphorus compound component (B) comprising the phosphorus compound (phosphonate compound) of the general formula (III) for the polycondensation reaction of the aromatic dicarboxylate ester enables the reaction of the component (B) with the titanium compound component (A) to be relatively gradually proceeded with in comparison with the conventional phosphorus compounds used as a reaction stabilizer, thus enabling the life time in catalytic activity of the titanium compound component (A) during the polycondensation reaction procedure to be elongated, and the amount ratio of the titanium compound component (A) to the aromatic dicarboxylate ester contained in the polycondensation reaction system to decrease. Also, an addition of a large amount of the reaction stabilizer to the polycondensation reaction system containing the phosphorus compound component (B) of the general formula (III) does not cause the thermal stability of the resultant polyester polymer to be reduced and the color tone of the polyester polymer to be degraded.

In the case where the mixture (1) is used as a polycondensation catalyst, the mixture (1) is employed in an amount satisfying the requirements represented by the following expressions of relation (i) and (ii):

$$1 \leq M_P/M_{Ti} \leq 15 \quad (i)$$

and $$10 \leq M_P + M_{Ti} \leq 100 \quad (ii)$$

wherein $M_{Ti}$ represents a ratio in % of a value in milli mole of titanium element contained in the titanium compound component (A) to a value in mole of the aromatic dicarboxylate ester, and $M_P$ represents a ratio in % of a value in milli mole of phosphorus element contained in the phosphorus compound component (A) to the value in mole of the aromatic dicarboxylate ester.

The ratio $M_P/M_{Ti}$ is 1 or more but not more than 15, preferably 2 or more but not more than 10. If the ratio $M_P/M_{Ti}$ is less than 1, the resultant polyester polymer may have a yellowish color tone. Also, if the ratio is more than 15, the resultant polycondensation catalyst may exhibit an insufficient catalytic activity for the polycondensation reaction, and thus the production of the target polyester polymer may become difficult. The range of the ratio $M_P/M_{Ti}$ of the catalyst usable for the present invention is relatively narrow compared with that of the conventional Ti-P catalysts. However, the restricted range of the ratio $M_P/M_{Ti}$ of the mixture (1) for the present invention enables the resultant catalyst to exhibit an excellent catalytic effect which has not been attained by the conventional Ti-P catalyst.

Also, the sum $(M_{Ti}+M_P)$ value is 10 or more but not more than 100, preferably 20 or more but not more than 70. The sum $(M_{Ti}+M_P)$ is less than 10, the resultant polyester polymer may exhibit an insufficient fiber-forming property which may causes the production efficiently in the melt-spinning procedure for the polyester polymer to be insufficient and the resultant polyester fibers to have insufficient performance. Also, if the sum $(M_{Ti}+M_P)$ is more than 100, in the melt-spinning procedure for the resultant polyester polymer, a foreign matter may deposit around the melt-spinneret, while the amount of the deposit is small. Generally, the $M_{Ti}$ value is preferably 2 to 5, more preferably 3 to 10.

In the case where the reaction products (2) are used as the polycondensation catalyst for the present invention, the phosphorus compounds of the general formula (IV) for the phosphorus compound component (D) include monoalkyl phosphates, for example, mono-n-butyl phosphate, monohexyl phosphate, monododecyl phosphate, and monooleyl phosphate; monoaryl phosphates, for example, monophenyl phosphate, monobenzyl phosphate, mono(4-ethylphenyl) phosphate, monobiphenyl phosphate, mononaphthyl phosphate, and monoanthryl phosphate; dialkyl phosphates, for example, diethyl phosphate, dipropylphosphate, dibutyl phosphate dilauryl phosphate, and dioleyl phosphate; and diaryl phosphates, for example, diphenyl phosphate, etc. Among the above-mentioned to phosphates, the phosphates of the general formula (IV) in which n represents an integer of 1, namely, monoalkyl phosphates and monoaryl phosphates are more preferred.

The phosphorus compound component (D) usable for the present invention may comprise a mixture of two or more of the phosphorus compounds of the general formula (IV), preferably a mixture of a monoalkyl phosphate with a dialkyl phosphates, or a mixture of monophenyl phosphate with diphenyl phosphate. Preferably, in the mixture, the content of the monoalkyl phosphate is 50% by mass or more, more preferably 90% by mass or more, based on the total mass of the mixture.

The preparation of the reaction product of the titanium compound component (C) with the phosphorus compound component (D) as mentioned above is carried out by, for example, mixing the components (C) and (D) with each other and heating the resultant mixture in a glycol. Namely, when a solution of the titanium compound component (C) and the phosphorus compound component (D) in glycol is heated, the glycol solution is made cloudy in white color by depositing the reaction product of the component (C) with the component (D). The deposit is collected and used as a catalyst for the production of the polyester polymer.

The glycol usable for the production of the above-mentioned reaction product is preferably the same as that for the glycol component for the production of the polyester polymer in the presence of the reaction product as a catalyst. For example, when the polyester polymer to be produced is a polyethylene terephthalate polymer, ethylene glycol is preferably used, when it is a polytrimethylene terephthalate,

1,3-propanediol is preferably used, and when it is a polytetramethylene terephthalate, tetramethylene glycol is preferably used.

The reaction product (2) for the polycondensation catalyst for the present invention can be prepared by another method in which the titanium compound component (C), the phosphorous compound component (D) and a glycol are simultaneously mixed with each other, and the resultant mixture is heated. In this method, as the titanium compound component (C) is reacted with the phosphorus compound component (D) by heating, to cause the resultant reaction product, which is insoluble in the glycol, to deposit, the reaction procedure until the deposition occurs is preferably carried out uniformly. Accordingly, to obtain the deposit of the reaction product with a high efficiency, the deposit is preferably produced by a method in which a solution of the titanium compound component (C) in the glycol and a solution of the phosphorus compound component (D) in the glycol are separately prepared, then the solutions are mixed with each other and the resultant mixture is heated.

The reaction of the component (C) with the component (D) is preferably carried out at a reaction temperature of 50° C. to 200° C. for a reaction time of one minute to 4 hours. If the reaction temperature is too low, the reaction may be incompleted or a very long time may be necessary to complete the reaction, and thus the target deposit may not be obtained by a uniform reaction and with a high efficiency.

In the thermal reaction of the titanium compound component (C) with the phosphorus compound component (D) in the glycol, the phosphorus compound component (D) are preferably employed in an amount, in terms of the molar ratio of phosphorus atoms to titanium atoms, in the range of from 1.0 to 3.0, more preferably from 1.5 to 25. When the components (C) and (D) are employed in the above-mentioned range, the titanium compound component (C) and the phosphorus compound component (D) are substantially completely reacted with each other and no incomplete reaction product is contained in the reaction product. Therefore, the reaction product can be directly employed without refining, and the resultant polyester polymer has a good color tone. Also, the resultant reaction product contains substantially no unreacted phosphorus compound of the formula (IV), and thus exhibit a high catalytic activity for the polycondensation, and the target polyester polymer is produced with a high productivity.

The reaction product (2) for the polycondensation catalyst usable for the present invention preferably contains a compound represented by the general formula (V):

in which formula (V), $R^9$ and $R^{10}$ respectively and independently from each other represents a member selected from alkyl groups derived from $R^1$, $R^2$, $R^3$ and $R^4$ in the general formula (I) representing the titanium alkoxides for the titanium compound component (C) and from $R^8$ in the general formula (IV) representing the phosphorus compounds for the phosphorus compound component (D) and having 1 to 10 carbon atoms, and aryl groups derived from $R^8$ in the general formula (IV) representing the phosphorus compound and having 6 to 12 carbon atoms.

The reaction products of the titanium compounds with the phosphorus compounds of the formula (III) or (IV), represented by the formula (V) have a high catalytic activity. Also, the polyester polymer produced by using the reaction products of the formula (V) exhibits a good color tone (a low b* value) and contents of acetaldehyde, residual metals and cyclic trimers are practically sufficiently low and have practically satisfactory performances.

The reaction products represented by the formula (IV) is preferably contained in a content by mass or more, more preferably 70% by mass or more, based on the total mass of the polycondensation catalyst.

In the polycondensation of the aromatic dicarboxylate ester in the presence of the reaction products (2), the reaction product (2) deposit obtained in the above-mentioned manner can be used as a catalyst for the production of the polyester polymer, without separating the reaction product (2) deposit and the glycol from the glycol liquid containing the deposited reaction product (2). Alternately, the deposit of the reaction product (2) is separated from the glycol liquid containing the deposited reaction product (2) by means of a centrifuge depositing the treatment or a filtration, the separated reaction product (2) deposit is refined by recrystallizing with a recrystallizing agent, for example, acetone, methyl alcohol and/or water, and then the refined reaction product (2) is employed as a polycondensation catalyst. The chemical structures of the reaction products (2) for the polycondensation catalyst can be confirmed by solid NMR and XMA metal quantitative analysis.

The polyester polymer usable for the present invention is produced by the polycondensation of the aromatic dicarboxylate ester in the presence of a catalyst comprising the mixtures (1) of the titanium compound component (A) with the phosphorus component (phosphonate compound) component (B) and/or the reaction products of the titanium compound component (C) with the phosphorus compound component (D). In the present invention, the aromatic dicarboxylate ester is preferably selected from diesters of aromatic dicarboxylic acid components with aliphatic glycol components.

In the present invention, the aromatic dicarboxylic acid component preferably comprises, as a principal ingredient, terephthalic acid. More particularly, the aromatic dicarboxylic acid component preferably contains terephthalic acid in an amount of 70 molar % or more, based on the total molar amount of the aromatic dicarboxylic acid component. The other aromatic acids than terephthalic acid are preferably selected from phthalic acid, isophthalic acid, naphthalenedicarboxylic acid, diphenyldicarboxylic acid and diphenoxyethanedicarboxylic acid.

The aliphatic glycol component preferably comprises an alkyleneglycol selected, for example, from ethylene glycol, trimethylene glycol, propylene glycol, tetramethylene glycol, neopentyl glycol, hexamethylene glycol and dodecamethylene glycol. Particularly, ethylene glycol is preferably employed.

In the present invention, the polyester polymer preferably comprises, as principal repeating units, ethylene terephthalate units formed from terephthalic acid and ethylene glycol. In this case, the repeating ethylene terephthalate units are preferably contained in a proportion of 70 molar % or more based on the total molar amount of the repeating units in the polyester polymer.

The polyester polymer usable for the present invention may be a copolyester polymer prepared by copolymerizing one or more comonomers usable as a acid component and/or a diol component for the polyester polymer.

The carboxylic acid usable as a comonomer for the copolyester polymer includes difunctional carboxylic acids and ester-forming derivatives thereof, for example, the above-mentioned aromatic dicarboxylic acids, aliphatic dicarboxylic acids, for example, adipic acid, sebacic acid, azelaic acid, and decanedicarboxylic acid; cycloaliphatic dicarboxylic acids, for example, cyclohexane dicarboxylic acid.

The diol compounds usable as comonomers, include the above-mentioned aliphatic diol compounds, cycloaliphatic glycol compound, for example, cyclohexanedimethanol, and aromatic diol compounds, for example, bisphenol, hydroquinone, and 2,2-bis(4-β-hydroxyethoxyphenyl) propane.

Also, another copolyester polymer prepared by using, as comonomers, polyfunctional compounds, for example, trimesic acid, trimethylolethane, trimethylol methane and pentaerythritol, can be used for the present invention.

The above-mentioned polyester polymers and copolyester polymers may be used alone or in a mixture of two or more thereof.

In the present invention, preferably polycondensation products of the aromatic dicarboxylate esters prepared from the aromatic dicarboxylic acids with the aliphatic glycols as mentioned above are used as polyesterpolymer. The aromatic dicarboxylate ester can be produced by a diesterification reaction of the aromatic dicarboxylic acids with the aliphatic glycols, or by a transesterification reaction of dialkylesters of the aromatic dicarboxylic acids with the aliphatic glycols. The method in which the dialkyl esters of the aromatic dicarboxylic acids are used as starting materials, and the ester is subjected to the transesterification reaction, is advantageous in that the scattering of the phosphorus compound added as a phosphorus stabilizing agent into the polycondensation system during the polycondensation reaction is slight in comparison with the method in which the aromatic dicarboxylic acid is subjected, as a starting compound, to the diesterification reaction.

Further, it is preferable that before the start of the transesterification reaction, a portion or all of the titanium compound component (A) or (C) is mixed into the reaction system, to utilize the titanium compound component as a reaction catalyst for both of the transesterification reaction and the polycondensation reaction. This manner enables the content of the titanium compound contained in the final product, namely a polyester polymer to be decreased. In the case of polyethylene terephthalate, particularly the transesterification reaction of a dialkyl ester of an aromatic dicarboxylic acid component comprising, as a principal component, terephthalic acid with ethylene glycol is preferably carried out in the presence of a titanium compound component (A) comprising at least one member selected from the group consisting of titanium alkoxides (a) represented by the general formula (I) and reaction products (b) of the titanium alkoxides of the general formula (I) with the aromatic polycarboxylic acids represented by the general formula (II) or anhydrides thereof. Then, the reaction mixture produced by the above-mentioned transesterification reaction and comprising a diester of the aromatic dicarboxylic acid with ethylene glycol is mixed with the component (B) comprising the phosphorus compound (phosphonate compound) represented by the general formula (III), or with the reaction product of the titanium compound component (C) with the phosphorus compound component (D), to proceed the polycondensation reaction.

The transesterification reaction is usually carried out under the ambient atmospheric pressure. However, if this reaction is carried out under a pressure of 0.05 to 0.20 MPa, the reaction due to the catalytic effect of the titanium compound component (A) is further promoted, and the generation of the by-product consisting of diethylene glycol in a large amount is prevented, and thus the resultant polyester polymer exhibit a further improved properties, for example, a high thermal stability. The transesterification reaction is preferably carried out at a temperature of 160 to 260° C.

In the present invention, in the case where terephthalic acid is used as an aromatic dicarboxylic acid, as a starting compound for the polyester polymer, terephthalic acid and dimethyl terephthalate are employed. In this case, recycled dimethyl terephthalate prepared by depolymerizing the polyalkylene terephthalate or recycled terephthalic acid prepared by hydrolyzing the recycled dimethyl terephthalate can be employed.

It is particularly preferred to use, as the material source for preparation of a polyester, recovered PET bottles, recovered fiber products, recovered polyester film products and polymer scraps generated in the manufacturing process of these products in view of effective utilization of resources.

The polycondensation reaction may be carried out in a single reaction vessel or successively in a plurality of reaction vessels. The polyester polymer produced by the polycondensation procedures as mentioned above is usually melt-extruded in the form of strands, cooled and then shaped (cut) into a particle (chip) form.

The polyester polymer produced by the polycondensation procedures is optionally further subjected to a solid phase polymerization procedure.

The solid phase polymerization is carried out in at least one stage, at a temperature of 190 to 230° C. under a pressure of 1 kPa to 200 kPa, in an inert or non-reactive gas atmosphere containing, for example, nitrogen, argon or carbon dioxide.

The chip-shaped polyester polymer produced through the above-mentioned solid phase polymerization procedure is optionally further subjected to a treatment with water by bringing the polymer chips into contact with water, steam, a steam-containing non-reactive (inert) gas or steam-containing air, to deactivate the catalyst remaining in the polymer chips.

The polyester polymer-producing process comprising the esterification step and the polycondensation step can be carried out in a batch type, a semi-continuous type or continuous type procedure.

The polyester polymer usable for the present invention is preferably selected from polyethylene terephthalate, polytrimethylene terephthalate and polytetramethylene terephthalate.

The polyester polymer produced by the above-mentioned procedures and usable for the present invention is preferably has an intrinsic viscosity in the range of from 0.40 to 0.80, more preferably from 0.45 to 0.75, still more preferably from 0.50 to 0.70. If the intrinsic viscosity is less than 0.40, the resultant polyester fibers may have insufficient mechanical strength. Also, if the intrinsic viscosity is more than 0.80, this too high intrinsic viscosity may cause an economical disadvantage of the resultant polyester polymer from which the polyester fibers are formed.

The polyester polymer usable for the present invention optionally further contains a small amount of an additive comprising at least one member selected from antioxidants, ultraviolet ray absorbers, flame detergents, fluorescent brightening agents, dulling agents, color-conditioners, defoaming agents, antistating agents, antibacterial agents, light-stabilizer, thermal stabilizers and light-screening agents. Particularly, a dulling agent consisting of titanium dioxide, and as a stabilizer, an antioxidant are preferably contained in the polyester polymer.

The titanium dioxide is preferably in the form of fine particles having an average particle size of 0.01 to 2 μm and contained in a content of 0.01 to 10% by mass based on the mass of the polyester polymer.

The content of titanium derived from the catalyst contained in the polyester polymer does not include titanium derived from titanium dioxide contained, as a dulling agent, in the polyester polymer.

When titanium dioxide is contained as a dulling agent in the polyester polymer, only the titanium dioxide used as the dulling agent can be removed from a sample of the polyester polymer for measurement of the content of the catalytic titanium, by dissolving the polyester polymer sample in hexafluoroisopropanol, the solution is subjected to a centrifugal separation treatment to cause only the titanium dioxide particles to be separated and deposited from the solution, an upper clear liquid fraction is separated and collected by a tilting method, the collected fraction is subjected to an evaporating procedure to evaporate away the solvent and to provide a dry sample for the measurement.

As an antioxidant, preferably a hindered phenol type antioxidant is used. The antioxidant is preferably mixed in a content of 1% by mass or less, more preferably 0.005 to 0.5% by mass in the polymer. If the content of the antioxidant is more than 1% by mass, the antioxidation effect may be saturated and sometimes may causes a scum to be generated during the melt-spinning procedure of the polyester polymer. The hindered phenol type antioxidant may be employed together with a thioether type secondary oxidation-preventing agent.

There is no limitation to the method of mixing the antioxidant into the polyester polymer. The antioxidant may be added into the reaction system at any stage between the start of the transesterification reaction and the end of the polycondensation reaction.

In the present invention, there is no limitation to the method of producing the fibers from the polyester polymer. The conventional melt-spinning method for polyester can be utilized. For example, the above-mentioned polyester polymer is melted, at a temperature in the range of from 270 to 300° C. and melt-spin. In this melt-spinning procedure, the melt-spin filament yarn is preferably taken up at a speed of 2500 to 4500 m/min., more preferably 2500 to 3500 m/min. When the taking up speed is within the above-mentioned range, the resultant filaments exhibit a sufficient mechanical strength and can be stably wound up at the taking up speed. Also, the polyester filaments produced by the melt-spinning procedure at the above-mentioned taking-up speed can exhibit a birefringence ($\Delta n$) of 0.03 to 0.06. This type of polyester filaments can be drawn and false twist-textured with less breakage of filaments and with less generation of fluffs.

The polyester fibers of the present invention preferably have an evenness, U % of 0.8% or less, a density of 1.345 to 1.370 g/cm$^3$, a shrinkage in hot water at a temperature of 65° C. of 25 to 55%, a highest tensile strength of 1.5 to 3.0 cN/dtex, an ultimate elongation of 90 to 160%, a primary stress at yield of 0.25 to 0.70 cN/dtex, a thermal stress peak value of 0.1 to 0.2 cN/dtex, and a thermal stress peak temperature of 0 to 10° C. above the glass transition temperature (Tg) of the polyester polymer from which the polyester fibers. The polyester fibers having the above-mentioned properties exhibit a stable draw and false twist-texturing property and can form false twist textured yarn having an improved level dyeing property and excellent physical properties.

The polyester fibers of the present invention can be produced by, for example, the following method.

The polyester polymer usable for forming the polyester fibers of the present invention are selected from those having an intrinsic viscosity of 0.40 to 0.80, which is determined by using a solution of the polymer in orthochlorophenol at 35° C. and is similar to that of the polyester polymers usable for the usual fabrics for cloths. For the production of the polyester fibers having a small individual fiber fineness of 0.1 to 1.0 dtex, a polyester polymer having an intrinsic viscosity in the range of from 0.50 to 0.6% is preferably employed.

In the production of the polyester fibers, a polyester polymer is pelletized, the polyester polymer pellets are dried and melted in a conventional melt-spinning apparatus equipped with a screw-extruder at a temperature of 40 to 70° C. above the melting point (Tm) of the polyester polymer, the melt of the polyester polymer is filtered through a filtering layer arranged in the melt-spinning apparatus (pack) and extruded through a spinneret. The residing time of the polyester polymer melt in the filtering layer is preferably established to such an extent that after the polyester polymer melt is cooled and solidified, the resultant polymer exhibits an intrinsic viscosity ($\eta_f$) of 0.50 to 0.60, more preferably 0.55 to 0.58. Also, preferably, the cross-sectional area per spinning orifice of the spinneret is $7\times10^{-5}$–$2\times10^{-4}$ cm$^2$, the ratio (L/D) of the length (L) of the spinning orifice to the diameter (D) of the spinning orifice is in the range of from 4 to 10, and the extruding rate of the polyester polymer per spinning orifice is in the range of from 0.06 to 0.20 g/minute. Under the above-mentioned melt-extruding conditions, the fluidity of the extruded polymer melt can be stabilized.

Then, the melt-extruded filamentary melt streams are passed through an atmosphere of which the temperature is controlled so that the filamentary melt streams are not cooled, then cool-solidified with a cooling air blast (preferably having a temperature of about 25° C.) supplied from a cross-flow type melt-spinning column, the resultant filaments are oiled with an oiling agent at a yarn guide of a metal ring nozzle type oiling and bundling apparatus, the oiled filaments are bundled into a yarn bundle, the filament bundle is interlaced by using an interlace nozzle, and the resultant interlace-treated filament yarn is taken up at the above-mentioned taking-up speed.

In the above-mentioned procedures, the melt-spinning procedure can be carried out at a high stability by heat-controlling the atmospheric temperature in a region of 0 to 40 mm length from the outlet face of the spinneret to in the range of from 100 to 300° C. so that the cooling of the polyester polymer melt streams is detarded.

Also, by bundling the filaments at a location of 350 to 500 mm far from the outlet face of the spinneret, the swinging of the extruded filamentary streams are made little and the resultant polyester fibers exhibit an increased evenness, namely U % in cross section of the individual filaments.

The polyester fibers of the present invention can be draw-false twist-textured to produce false twist textured filament yarn being substantially free from fluffs and having excellent quality.

The false twist-textured yarn preferably has a total percentage of crimp (TC) of 2 to 5%, a shrinkage (FS) in hot water of 2.5 to 4.5%, a tensile strength of 2.5 to 4.5 cN/dtex, and an ultimate elongation of 15 to 35%.

The false twist-textured yarn having the above-mentioned performances has very little fluffs and untwisted spots and exhibits a high level dyeing property (a little unevenness in dyeing property), even in a very small thickness.

Figure 1:
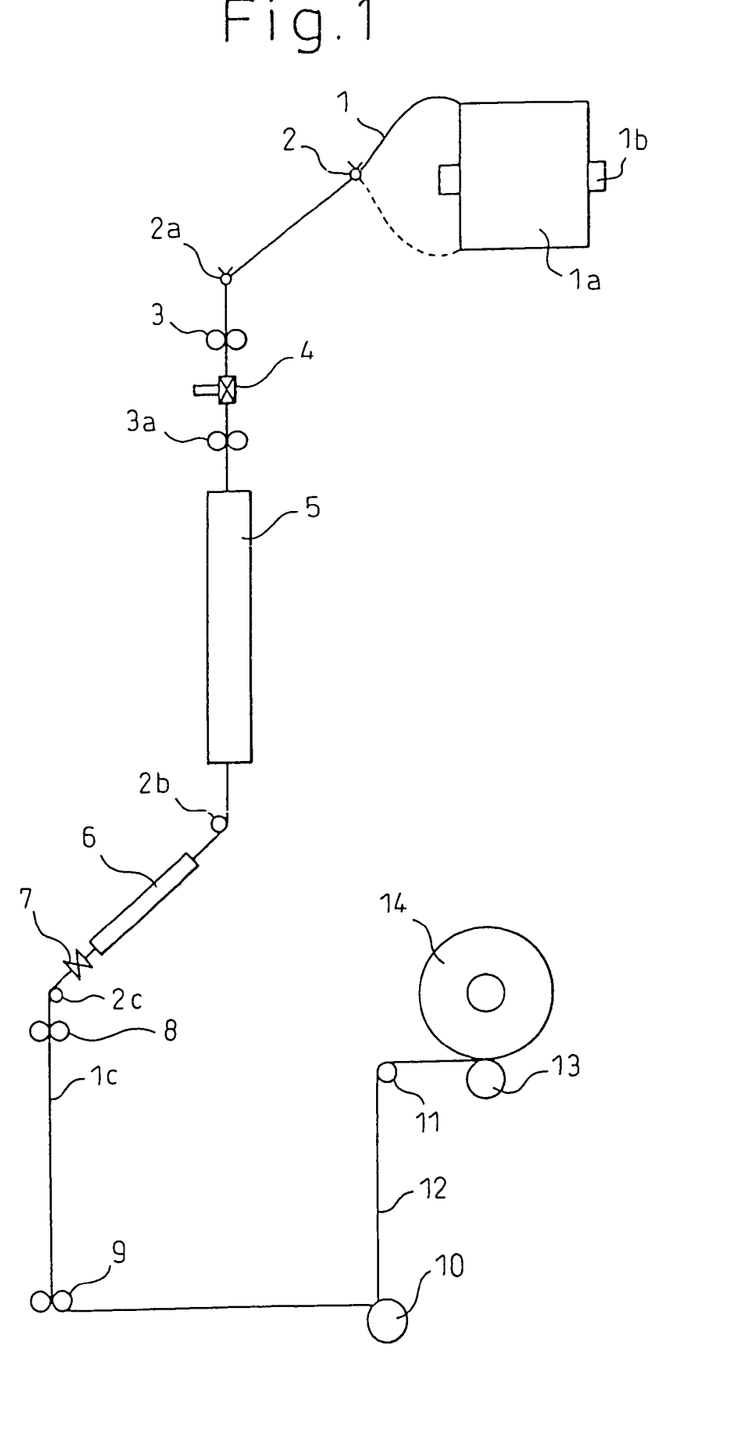
FIG. 1 is an explanatory diagram showing an embodiment of the production procedure for polyester fiber-containing and false twist-textured yarn of the present invention.

In the production of the above-mentioned false twist-textured yarn, the method using the means as shown in FIG. 1 is preferably utilized. In this case, a draw and false twist-texturing procedure under the following conditions are preferably carried out.

Referring to FIG. 1, an undrawn polyester multifilament yarn 1 is unwound from a winding package 1a rotatable around a rotation shaft 1b, and fed into an interlacing apparatus 4 having a filament-interlacing means, for example, a air-jetting nozzle for interlacing the filaments, through an unwound yarn guides 2 and 2a, by means of a pair of feed rollers 3. In the interlacing apparatus 4, the individual filaments in the multifilament yarn are interlaced with each other. The interlace-treated multifilament yarn 1 is fed into a draw-false twist-texturing apparatus constituted from, for example, a pair of feed rollers 3a, draw-false twist heater 5, a yarn guide 2b, a cooling plate 6, an frictional false-twisting disc unit 7, a yarn guide 2c and a pair of first delivery rollers 8. In the false-twisting apparatus, the interlaced multi-filament yarn is drawn between the feed rollers 3a and the first delivery rollers 8, and false-twisted by the frictional false-twisting disc unit 7. Namely, the multifilament yarn 1 is introduced into the false-twisting apparatus through the feed rollers 3a and heated on the heater 5 to an extent such that the residence time of the yarn on the heater is 0.052 to 0.300 second, preferably 0.060 to 0.150 second, and at the outlet of the heater, the temperature of the filament yarn reaches a level of 90 to 140° C., preferably 110 to 130° C., above the glass transition temperature (Tg) of the polyester polymer from which the filaments are formed. In this step, the filament yarn is drawn at a draw ratio of 1.40 to 1.70, preferably 1.5 to 1.6, due to a difference in peripheral speeds between the feed rollers 3a and the first delivery rollers 8. The heater 5 preferably has a length of 1.0 to 2.5 mm.

The multifilament yarn 1 is forwarded from the heater 5 to the cooling plate 6 through the yarn guide 2b and cooled by contacting the cooling plate 6 to a temperature appropriate to the frictional false twisting procedure, for example, of 10 to 50° C. below the Tg of the polyester polymer. Then, the cooled multifilament yarn is fed to the frictional false-twisting disc unit 7 and subjected to the frictional false-twisting procedure.

The draw and frictional false-twisting procedure enables the resultant false twist-textured multifilament yarn to be free from generation of untwisted spots on the yarn and thus the sources of uneven dyeing of the yarn to be removed.

The temperature of the multifilament yarn located in the outlet of the heater of the draw-false twisting apparatus can be measured by a non-contact scanning thermometer (for example, model H-7508, made by TEIJIN ENGINEERING K.K.).

The false twist-textured multifilament yarn prepared by the above-mentioned draw-false twist texturing treatment is delivered from the false-twisting apparatus through the first delivery rollers 8, and forwarded to an oiling agent applicater 10 through a second delivery rollers 9. In the applicater 10, an oiling agent is applied to the yarn, and then the oiled yarn is wound up through a yarn guide 11 by a winding up roller 13 to form a package 14 of the drawn and textured yarn. Optionally, a heat-setter and/or an interlacing apparatus (not shown in FIG. 1) are arranged between the first delivery rollers 8 and the second delivery rollers 9. Also, the tension of the yarn is measured in an intermediate part 12 between the oiling agent-applicator 10 and the yarn guide 11 to control the winding tension applied to the yarn.

The amount of the oiling agent to be applied to the drawn and false twist-textured polyester filament yarn is preferably controlled in the range of from about 0.5 to about 1% by mass based on the mass of the drawn and false twist-textured yarn. The oiling agent is usually selected from those containing, as a principal component, a mineral oil. In the case where the false twist-textured filament yarn has an individual filament thickness of 0.5 dtex or less, and the number of filaments in the yarn is 100 or more, the oiling agent is preferably applied in an amount of 1.3 to 3.0% by mass, more preferably 1.5 to 2.3% by mass based on the mass of the false twist-textured yarn, to cause the peripheral surfaces of the individual filaments to be evenly coated by the oiling agent. By evenly coating the filaments with the oiling agent as mentioned above, an insufficient reelability of the yarn and friction between the yarn and the yarn guides in the succeeding yarn-twisting, warping, knitting and weaving procedures, can be made low and the accumulation of scum derived from the oiling agent around the yarn guides, etc. can be controlled. A finish oiling agent is applied by using a roller type oil-applicator, or a metering nozzle type oil-applicator.

The false twist-textured yarn of the present invention is wound up under a winding tension of 0.05 to 0.30 cN/dtex, preferably 0.12 to 0.23 cN/dtex, measured in the portion 12 in FIG. 1, at a winding speed of 500 to 1200 m/min, preferably 600 to 1000 m/min. These winding conditions enable a compression of the yarn package due to a high winding tension and a crush of cardboard core to be prevented and thus the generation of difference in yarn quality between the inside and the outside portions of the wound package of the false twist-textured yarn to be controlled. Also, the above-mentioned winding conditions contribute to preventing the generation of a serging phenomenon of the yarn which refers to as a rolling of the yarn on the false-twisting means, to enable the yarn to be regularly wound up. Also, the generation of the untwisted spots on the yarn is repressed.

As a frictional false-twisting machine usable for the draw-false twist texturing procedure, a frictional false-twisting type disc unit in which urethane resin discs having a hardness of 75 to 95 degrees and a thickness of 5 to 12 mm are triaxially arranged, is preferably employed.

In this false twist-texturing machine, the multifilament yarn is preferably fed at an angle of 30 to 45 degrees from the rotation axis of the disc and false-twisted. Also, when the false-twisting conditions are established so that the false twist number (in turns/m) of the yarn is in the range of from $25,000/F^{1/2}$ to $35,000/F^{1/2}$, wherein F represents a thickness in dtex of the target false twist-textured yarn, the generation of fluffs on the resultant false twist-textured yarn can be repressed.

The false twist textured yarn of the present invention preferably exhibits a difference between a L* value and a b* value in the range of from 91.0 to 99.0, more preferably 93.0 to 99.0, determined in accordance with the L* a* b* color specification (JIS Z 8729), due to an effect of the employment of the specific catalyst in the production of the polyester polymer.

EXAMPLES

The present invention will be further explained by the following examples.

In the examples, the properties of polyester polymers, catalysts, melt-spinning procedure, polyester fibers and false twist-textured filament yarns were determined by the following measurements.

(1) Intrinsic Viscosity

The intrinsic viscosity of a polyester polymer was determined in a solvent consisting of orthochlorophenol at a temperature of 35° C.

(2) Concentrations of Titanium and Phosphorus in Polyester Polymer

In the measurement of the concentration of a residual catalytic metals in the polyester, samples were heat-melted on an aluminum plate and a molded specimen having a flat surface was made by a compression press, and then the concentration of the metals in the molded specimen was determined by using a fluorescent X-ray analysis apparatus, Model 3270E, manufactured by Rigaku Denki Kogyo K.K.

(3) Content of Diethylene Glycol (DEG) in Polyester Polymer

A polymer was decomposed by using hydrazine hydrate and the content of diethylene glycol in the decomposition product was measured by gas chromatography (model: 263-70, manufactured by Hitachi, Ltd.).

(4) Height of Foreign Matter Layer Formed on Spinneret

After the continuous melt-spinning procedures were carried out for 3, 6, or 9 days in the method and conditions as described in each example, a release agent was sprayed against the outlet surface of the spinneret to cause the extruded polyester polymer to not adhere to the outlet surface, then the spinneret was detached. Then, the height of a foreign matter layer adhered and accumulated around each extrusion hole was measured by using a microscope. With respect to all the extrusion holes, the heights of the foreign matter layers were measured and an average value of the data was calculated. The height of the foreign matter layer on the spinneret is represented by the average value.

(5) Birefringence (Δn)

The birefringence of a polyester fiber was determined from a retardation value and thickness value of the polyester individual fiber measured by a conpensator method using a polarizing microscope (model: BH-2, made by OLYMPUS K.K.).

(6) Density

The density of a polyester polymer was determined by a density gradient tube method using a n-heptane/tetrachloromethane mixture prepared so that the measured density comes into the range of from 1.276 to 1.416.

(7) Breakages of Filaments During Melt-spinning Procedure

A melt-spinning apparatus using a single spinneret was continuously operated under the conditions of each example for one week, the number of breakages of the filaments during the one week operation was recorded except for the breakages occurred due to human work or mechanical cause. From the resultant data, the number of breakages of the filaments per spinneret per day was calculated. The breakage number of filament in the melt-spinning procedure is represented by the calculation result.

(8) Glass Transition Temperature (Tg) of Polyester Polymer

A polyester polymer in a fixed amount was charged into an aluminium sample pan and sealed, and then placed in a DSC measurement apparatus, heated from room temperature to a temperature of 280° C. with a temperature increasing rate of 10° C./min. in a nitrogen gas stream, maintained at the above-mentioned temperature for 2 minutes and then immediately withdrawn from the measurement apparatus and rapidly cooled in a nitrogen gas atmosphere to provide a sample pan in which the polyester polymer is solidified in an amorphous state. The sample was heated under the same conditions as mentioned above, while drawing a temperature-increasing curve. From the curve, a glass transition temperature (Tg) of the polyester polymer was calculated.

(9) Temperature of Travelling Filament Yarn

The temperature of a filament yarn passing through an outlet of a draw-false twist heater was measured by using a non-contact thermometer for moving article (model: H-7508, made by TEIJIN ENGINEERING K.K.).

(10) Degree of Interlace

The number of interlaces of filaments in a polyester multifilament yarn per m of the yarn was measured by using a Rochelld type interlace meter. This measurement was repeated ten times and a average of the measurement results were calculated. The degree of interlace of the filament yarn is represented by the calculated average.

(11) Fluffs

A false twist textured filament yarn was subjected to a continuous measurement of the number of fluffs appearing on the filament yarn by using a fluff counter apparatus (model: DT-104, made by TORAY K.K.) at a speed of 500 m/min for 20 minutes. The number of fluffs on the filament yarn is represented by the number of fluffs per $10^6$ m of the filament yarn.

(12) Total Percentage of Crimp (TC) (%)

An extremely fine false twist-textured filament yarn was wound around a hank frame under a tension of 0.044 cN/dtex (50 mg/denier) to provide a hank having a thickness of about 3300 dtex. A load of 0.00177 cN/dtex+0.177 cN/dtex (2 mg/denier+200 mg/denier) was applied on a lower end of the hank, and 1 minute after the application of the load, the length $L_0$ of the hank was measured in cm. After removing the load of 0.177 cN/dtex (200 mg/denier) from the hank, then the hank was treated in boiling water having a temperature of 100° C. for 20 minutes. After the boiling water treatment, the load of 0.00177 cN/dtex (2 mg/denier) was removed from the hank, the unloaded hank was naturally dried under load-free condition for 24 hours. The naturally dried hank was loaded with a load of 0.00177 cN/dtex+0.177 cN/dtex (2 mg/denier+200 mg/denier), and one minute after the application of the load, the length $L_1$ (cm) of the hank was measured. Then the load of 0.177 cN/dtex (200 mg/denier) was removed from the hank, after one minute from the removal of the load, the length $L_2$ (cm) of the hank was measured.

The percentage of crimp of the filament yarn was calculated in accordance with the equation:

Percentage of crimp (%)=$[(L_1-L_2)/L_0] \times 100$

The measurement was repeated 10 times and an average of the measurement results was calculated. The percentage of crimp of the false twist-textured filament yarn is represented by the average.

(13) Tensile Strength and Ultimate Elongation

A specimen of yarn was subjected to a tensile test using a tensile tester (Tensilon, made by K.K. SHIMAZU SEISAKUSHO) at a specimen length of 20 cm at an elongation rate of 20%/min to draw a stress-strain curve. From the resultant curve, the tensile strength and the ultimate elongation of the yarn was determined.

(14) Breakages of False Twist-textured Filament Yarn (Breakages/Ton)

A false twist-texturing machine was continuously operated for one week under the same conditions as in each example, in the operation, each of 10 kg wound drawn polyester yarn packages was subjected to the false twist texturing procedure to convert each package to two 5 kg false twist-textured yarn packages. The number of breakages of the yarn generated during the false twist texturing procedure, except for the breakages occurred due to human work and mechanical cause was recorded.

The number of breakages of the yarn is represented by the number of breakages per ton (1000 kg) of the yarn. (15) (L*−b*) valve A polyester fiber yarn was take-knitted by using a 12 gage circular knitting machine to provide a tabular knitted fabric having a length of 30 cm. The knitted fabric was submitted to a measurement of L* value and b* value using a Hunter differential colorimeter (model: CR-200, made by MINOLTA K.K.), from the resultant L* and b* values, a difference (L*−b*) was calculated.

Example 1

A stainless steel reaction container in which a reaction under an pressurized condition can be carried out is charged with a mixture of 100 parts by mass of dimethyl terephthalate with 70 parts by mass of ethylene glycol and then with 0.009 part by mass of tetra-n-butyl titanate. The reaction mixture was subjected to a transesterification reaction while heating to a temperature of from 140° C. to 240° C. under a pressure of 0.07 MPa. After the reaction was completed, 0.035 part of triethyl phosphonoacetate was mixed into the reaction product.

The reaction product containing diethyl terephthalate ester was placed in a polycondensation reactor and heated to a temperature of 290° C. under a high vacuum of 26.67 Pa or less, to proceed a polycondensation reaction of the diethyl terephthalate ester, and to produce a polyester polymer having an intrinsic viscosity of 0.60 and a diethyleneglycol content of 1.5%. The polyester polymer was molded into a chip form. The polyester polymer has a $M_P$ value of phosphorus element of 30, a $M_{Ti}$ value of titanium element of 5, a ratio $M_P/M_{Ti}$ of 6 and a sum $M_P+M_{Ti}$ of 35.

The polyester polymer chips were dried, fed into in a melt-spinning apparatus equipped with a screw type extruder, melted in the extruder. The melt was introduced into a spinning block maintained at a temperature of 315° C., filtered through a spinning pack and then extruded through a 288 circular extrusion holes having a diameter of 0.15 mm and formed in a spinneret at an extrusion rate of 39 g/min, into the form of filamentary streams.

The extruded filamentary streams of the polymer melt was passed through a hot zone formed between the outlet surface of the spinneret and a location of 30 mm spaced from outlet surface of the spinneret and maintained at a temperature of 230° C., and cooled by cooling air blast having a temperature of 25° C. and supplied from a cross-flow type spinning column. The resultant solidified filaments were bundled while oiling the filaments with an oiling agent supplied from a metering nozzle type oiling guide arranged at a location spaced 420 mm (a bundling length) from the outlet surface of the spinneret.

The resultant filament bundle was taken up through a pair of godet rollers rotating at a periphery speed of 3000 m/min., and wound up by using a winder, to provide a undrawn polyester multifilament yarn having a birefringence of 0.047, a density of 1.346 and a yarn count of 130.5 dtex/288 filaments.

In the melt-spinning procedure, the foreign matter layer adhered and accumulated around the spinneret had a height of 1.8 μm at the stage of 3 days after the start of the melt-spinning and of 3.0 μm at the stage of 9 days after the start of the melt-spinning. Also, the number of breakages of the yarn was 0.14 time per day per spinneret, at the stage of 9 days after the start of the melt-spinning. Namely, the breakages of the yarn was very little. The resultant polyester multifilament yarn had the number of fluffs of 0.01 fluff/$10^6$ m or less and a (L*−b*) value of 95.0.

The undrawn polyester multifilament yarn was unwound from the winding package, fed into a draw, false twist texturing machine (model: HTS-15V, made by TEIJIN SEIKI K.K.) equipped with a non-contact slit heater having a length of 1.04 m. In this machine, the individual filaments in the yarn were air-interlaced with air blast supplied through an air nozzle, into a degree of interlace of filaments of 65. The undrawn, interlaced multifilament yarn was fed into a false twist-texturing procedure using a frictional false-twisting disc unit in which polyurethane discs having a hardness of 90 degrees, a thickness of 9 mm and a diameter of 58 mm were triaxially arranged, at a yarn-feeding angle of 40 degrees from the rotation axis of the discs, to simultaneously draw and false twist-texture the filament yarn at a (the number of twist)×(thickness (dtex) of false twist-textured yarn)$^{1/2}$ of 30,000, a forwarding filament yarn temperature of 200° C. (which is 133° C. above the Tg), for a residing time in the heater of 0.089 second at a draw ratio of 1.57. The resultant false twist-textured yarn was oiled with a finish oiling agent (containing, as a principal component, 90% of a mineral oil) in an amount of 1.8% by mass based on the mass of the filament yarn, and then the oiled, false twist-textured filament yarn having a yarn count of 85.0 dtex/288 filaments and an individual filament thickness of 0.29 dtex was wound up under a winding tension of 0.18 cN/dtex at a winding speed of 700 m/min. to form a yarn package.

In the draw, false twist-texturing procedure, the number of breakages of the yarn was 3.1 times/ton. The resultant false twist-textured filament yarn had a total percentage crimp (TC) of 2.9%, a tensile strength of 3.4 cN/dtex, an ultimate elongation of 26.0%, the number of fluffs of 0.02 fluff/$10^6$ m and a difference (L*−b*) of 94.9.

Comparative Example 1

A stainless steel reaction container in which a reaction under an pressurized condition can be carried out was charged with a mixture of 100 parts by mass of dimethyl terephthalate with 70 parts by mass of ethylene glycol and then with 0.064 part by mass of calcium acetate hydrate. The reaction mixture was subjected to a transesterification reaction while heating to a temperature of from 140° C. to 240° C. under a pressure of 0.07 MPa. Into the reaction mixture, 0.044 part by mass of an aqueous solution of 56% by mass of phosphoric acid was mixed, to complete the reaction.

The reaction product containing mixture was placed in a polycondensation reactor and heated to a temperature of 290° C. under a high vacuum of 26.67 Pa or less, while mixing diantimony trioxide into the reaction mixture to proceed a polycondensation reaction of the diethyl terephthalate ester. A polyester polymer having an intrinsic viscosity of 0.630 was obtained. The polyester polymer is molded into a chip form.

The polyester polymer chips were melt-spin by the same procedures as in Example 1, except that the polyester polymer chips of Example 1 was replaced by the above-mentioned polyester polymer chips.

The resultant polyester multifilament yarn (a partially oriented filament yarn) had a yarn count of 130.0 dtex/288 filaments.

In this comparative example, with the lapse of the melt-spinning time, the adhesion and accumulation of foreign matter around the spinneret were rapidly proceeded, and with increase in the bendings, swingings and rotations of the extruded filamentary melt streams, the number of breakages of the spin filaments rapidly increased. In this connection, 3 days after the start of the melt-spinning, the height of the foreign matter layer formed around the spinneret reached 28.0 μm the number of breakages of the spin filaments was 16.0 times/day-spinneret, and thus the continuation of the normal melt-spinning procedure became difficult. Thus the melt-spinning procedure was stopped. The resultant undrawn polyester filaments had the number of fluffs of 0.06/$10^6$ m or less, and a difference ($L^*-b^*$) of 91.7.

The resultant undrawn polyester filament yarn (partially oriented filament yarn) in the package was subjected to the draw, false twist-texturing procedures in the same manner and conditions as in Example 1. A false twist textured filament yarn having a yarn count of 84 dtex/288 filaments was obtained.

In the false twist texturing procedures, the number of breakages of the false twist-textured yarn was 8.3 times/ton. Also, the resultant false twist-textured filament yarn had a total percentage crimp (TC) of 3.0, a tensile strength of 3.5 cN/dtex, an ultimate elongation of 25.8%, the number of fluffs of 0.82 fluff/$10^6$ m and a difference ($L^*-b^*$) value of 90.9.

Example 2

Preparation of Catalyst

Ethylene glycol in an amount of 919 g was mixed with 10 g of acetic acid while stirring. The resultant mixture was mixed with 71 g of titanium tetrabutoxide to provide a clear solution of the titanium compound in ethylene glycol. Separately, 34.5 g of monolauryl phosphate were mixed into 656 g of ethylene glycol while heating to 100° C. and stirring, to provide a clear solution.

The above-mentioned two clear solutions were mixed with each other at 100° C., the mixture was stirred for one hour, to provide a white clouded liquid. In this reaction, the mixing ratio of the two clear solution was controlled so that the amount of phosphorus atoms in the clear titanium compound solution was 2.0 moles per mole of titanium atoms in the clear phosphorus compound solution. The resultant white deposits were collected by filtration, washed with water and dried. The dried product was employed as a catalyst which will be referred as to a TPI-2.0 catalyst.

Preparation of Polyester Polymer

In a reactor in which 225 parts by mass of a diethylene terephthalate oligomer were contained and conditioned at a temperature of 255° C. under the ambient atmospheric pressure in a nitrogen gas atmosphere, a slurry prepared by mixing 179 parts by mass of a high purity terephthalic acid with 95 parts by mass of ethylene glycol was fed at a constant feed rate, and stirred in the reactor to allow the compounds to be esterification reacted with each other, while distilling away the by-products comprising water and ethylene glycol. This esterification reaction was continued for 4 hours to complete the reaction. In the results of this reaction, the degree of esterification was 98% or more, and the degree of polymerization of the resultant oligomer was about 5 to about 7.

The oligomer in an amount of 225 parts by mass provided by the above-mentioned esterification reaction was placed in a polycondensation vessel, and mixed with 3.34 parts by mass of the TPI-2.0 catalyst. The resultant polycondensation system was heated stepwise to a temperature of from 255° C. to 280° C. and pressurized stepwise to a pressure of from the ambient atmospheric pressure to 60 Pa, while stirring, and removing the by-products, for example, water and ethylene glycol produced by the reaction, from the polycondensation system.

The degree of proceeding of the polycondensation reaction was checked by monitoring the load on the stirring paddles in the reaction system and when the degree of polymerization of the polyester polymer reached the desired level, the reaction was ended. Then, the reaction product in the polycondensation system was continuously extruded through an extrusion hole formed in the polycondensation reactor into the form of a strand. The extruded polymer strand was cooled and cut into a pellet form having a diameter of about 3 mm. The resultant polyethylene terephthalate polymer had an intrinsic viscosity of 0.64.

Production of Polyester False Twist-textured Filament Yarn

The polyester polymer chips were dried, fed into in a melt-spinning apparatus equipped with a screw type extruder, melted in the extruder. The melt was introduced into a spinning block maintained at a temperature of 315° C., filtered through a spinning pack and then extruded through a 288 circular extrusion holes having a diameter of 0.15 mm and formed in a spinneret at an extrusion rate of 39 g/min., into the form of filamentary streams.

The extruded filamentary streams of the polymer melt was passed through a hot zone formed between the outlet surface of the spinneret and a location of 30 mm spaced from outlet surface of the spinneret. The temperature of the hot zone was maintained at 230° C. Then, the filamentary streams were cooled by cooling air blast having a temperature of 25° C. and supplied from a cross-flow type spinning column. The resultant solidified multifilaments were oiled with an oiling agent by a metering nozzle type oiling guide arranged at a location 420 mm spaced from the outlet surface of the spinneret, while the filaments were bundled to form a filament bundle.

The resultant filament bundle was taken up through a pair of godet rollers rotating at a periphery speed of 3000 m/min., and wound up by using a winder, to provide a undrawn polyester multifilament yarn having a birefringence of 0.045, a density of 1.345 and a yarn count of 130 dtex/288 filaments.

In the melt-spinning procedure, the foreign matter layer adhered and accumulated around the spinneret had a height of 2.0 μm at the stage of 3 days after the start of the melt-spinning and of 2.8 μm at the stage of 9 days after the start of the melt-spinning. Also, the number of breakages of the yarn was 0.14 per day per spinneret, at the stage of 9 days after the start of the melt-spinning. Namely, the breakages of the yarn was very little. The resultant polyester multifilament yarn had the number of fluffs of 0.01 fluff/$10^6$ m or less and a ($L^*-b^*$) value of 95.6.

The undrawn polyester multifilament yarn was unwound from the winding package, and fed into a draw, false twist texturing machine (model: HTS-15V, made by TEIJIN SEIKI K.K.) equipped with a non-contact slit heater having a length of 1.04 m. In this machine, the individual filaments in the yarn were air-interlaced with each other by air blast supplied through an air nozzle, into a degree of interlace of filaments of 65. The undrawn, interlaced multifilament yarn was fed into a false twist-texturing procedure using a frictional false-twisting disc unit in which polyurethane discs having a hardness of 90 degrees, a thickness of 9 mm and a diameter of 58 mm were triaxially arranged, at a yarn-feeding angle of 40 degrees from the rotation axis of the discs, to simultaneously draw and false twist-texture the filament yarn at a (the number of twist)×(thickness (dtex) of false twist-textured yarn)$^{1/2}$ of 30,000, a forwarding filament yarn temperature of 206° C. (which is 133° C. above the Tg), for a residing time in the heater of 0.089 second at a draw ratio of 1.58. The resultant false twist-textured yarn was oiled with a finish oiling agent (containing, as a principal component, 90% of a mineral oil) in an amount of 1.8% by mass based on the mass of the filament yarn, and then the oiled, false twist-textured filament yarn having a yarn count of 83.5 dtex/288 filaments and an individual filament thickness of 0.29 dtex was wound up under a winding tension of 0.18 cN/dtex at a winding speed of 700 m/min. to form a yarn package.

In the draw, false twist-texturing procedure, the number of breakages of the yarn was 2.2 per ton of the yarn. The resultant false twist-textured filament yarn had a total percentage crimp (TC) of 3.1%, a tensile strength of 3.2 cN/dtex, an ultimate elongation of 26.5%, the number of fluffs of 0.01 fluff/10$^6$ m and a difference (L*−b*) of 94.5.

Comparative Example 2

A polyethylene terephthalate polymer having an intrinsic viscosity of 0.630 was prepared by polycondensing dimethyl terephthalate with ethylene glycol in the presence of a polycondensation catalyst consisting of diantimony trioxide (Sb$_2$O$_3$).

The polyethylene terephthalate polymer was pelletized and the pellets were subjected to a melt-spinning procedure under the same method and conditions as in Example 1 to provide polyester filament yarn (partially oriented) having a yarn count of 130 dtex/288 filaments.

In this comparative example, a foreign matter generated around the spinneret rapidly became bigger with the lapse of the melt-spinning time, to cause the bending, the swingings and the circlings of the extruded filament yarn to be promoted, and thus the breakages of the filament yarn rapidly increased. Thus, 3 days after the start of the melt-spinning procedure, the height of the foreign matter layer formed on the spinneret reached 28.0 μm, and the number of breakages of the extruded filament yarn reached 16 times/day spinneret. At this stage, the melt-spinning procedure could not regularly be continued, and thus was stopped. The resultant polyester filament yarn had the number of fluffs of 0.06/10$^6$ m and a difference (L*−b*) value of 91.7.

The resultant undrawn (partially oriented) polyester multifilament yarn was subjected to a draw false twist-texturing procedure in the same method and conditions as in Example 1, to provide a false twist-textured yarn having a yarn count of 84 dtex/288 filaments.

In the false-twist texturing procedure, the number of breakages of the filament yarn was 8.3 times per ton of the yarn. The resultant false twist-textured yarn had a total percentage crimp (TC) of 3.0%, a tensile strength of 3.5 cN/dtex, an ultimate elongation of 25.8%, the number of fluffs of 0.82/10$^6$ m, and a difference (L*−b*) value of 90.9.

INDUSTRIAL APPLICABILITY

Polyester fibers having a good color tone and a high stability of the draw-false twist texturing procedure can be provided in accordance with the present invention. The polyester fibers are substantially free from fluffs and enable a false twist textured yarn having a good color tone and a very high quality to be produced. The textured yarn can be advantageously used for high quality cloths, and textile materials for interior, and thus has a high practical applicability.

What is claimed is:

1. Polyester fibers comprising, as a principal component, a polyester polymer and having an individual fiber thickness of 0.1 to 1.0 dtex,
   wherein
   the polyester polymer is one produced by polycondensing an aromatic dicarboxylate ester in the presence of a catalyst,
   the catalyst comprises at least one member selected from the mixtures (1) and reaction products (2) as specified below,
   the mixture (1) for the catalyst comprises
   (A) a titanium compound component comprising at least one member selected from the group consisting of:
   (a) titanium alkoxides represented by the general formula (I):

in which formula (I), R$^1$, R$^2$, R$^3$ and R$^4$ respectively and independently from each other represent a member selected from alkyl groups having 1 to 20 carbon atoms and a phenyl group, m represents an integer of 1 to 4, and when m represents an integer of 2, 3 or 4, the 2, 3 or 4 R$^2$s and R$^3$s may be respectively the same as each other or different from each other, and
   (b) reaction products of the titanium alkoxides of the general formula (I) with aromatic polycarboxylic acids represented by the formula (II):

in which formula (II), n represents an integer of 2 to 4, or anhydrides of the acids of the formula (II), and mixed with
   (B) a phosphorus compound component comprising at least one phosphorus compound represented by the general formula (III):

in which formula (III), $R^5$, $R^6$ and $R^7$ respectively and independently from each other represent an alkyl group having 1 to 4 carbon atoms, X represents a member selected from a —$CH_2$— group and a —CH(Y)— group (wherein Y represents a phenyl group), the mixture (1) for the catalyst for the polycondensation being employed in an amount satisfying the requirements represented by the following expressions of relation (i) and (ii):

$$1 \leq M_P/M_{Ti} \leq 15 \quad \text{(i)}$$

and $$10 \leq M_P + M_{Ti} \leq 100 \quad \text{(ii)}$$

wherein $M_{Ti}$ represents a ratio in % of a value in milli mole of titanium element contained in the titanium compound component (A) to a value in mole of the aromatic dicarboxylate ester, and $M_P$ represents a ratio in % of a value in milli mole of phosphorus element contained in the phosphorus compound component (A) to the value in mole of the aromatic dicarboxylate ester; and the reaction products (2) for the catalyst comprises
(C) a titanium compound component comprising at least one member selected from the groups consisting of:
(c) titanium alkoxides represented by the general formula (I) and
(d) reaction products of the titanium alkoxides of the general formula (I) with aromatic polycarboxylic acids represented by the above-mentioned general formula (II) or anhydride of the acids; and reacted with
(D) a phosphorus compound component comprising at least one phorous compound represented by the general formula (IV):

in which formula (IV), $R^8$ represents an alkyl group having 1 to 20 carbon atoms or an aryl group having 6 to 20 carbon atoms, and p represents an integer of 1 or 2.

2. The polyester fibers as claimed in claim 1, wherein in each of the component (A) of the mixture (1) and the component (C) of the reaction products (2) for the catalyst, a reaction molar ratio of each of titanium alkoxides (a) and (c) to the aromatic polycarboxylic acid of the general formula (II) or the anhydride thereof is in the range of from 2:1 to 2:5.

3. The polyester fibers as claimed in claim 1, wherein in the reaction product (2) for the catalyst, a reaction amount ratio of the component (D) to the component (C) is in the range of, in terms of ratio (P/Ti) of the molar amount of phosphorus atoms contained in the component (D) to the molar amount of titanium atoms contained in the component (C), from 1:1 to 3:1.

4. The polyester fibers as claimed in claim 1, wherein the phosphorus compound of the general formula (IV) for the reaction product (2) is selected from monoalkyl phosphates.

5. The polyester fibers as claimed in claim 1, wherein the dialkyl aromatic dicarboxylate ester is one produced by a transesterification reaction of a dialkyl ester of an aromatic dicarboxylic acid with an alkylene glycol in the presence of a titanium-containing catalyst.

6. The polyester fibers as claimed in claim 1 or 2, wherein the aromatic dicarboxylic acid is selected from terephthalic acid, 1,2-naphthalene dicarboxylic acid, phthalic acid, isophthalic acid, diphenyldicarboxylic acid and diphenoxyethane dicarboxylic acid; and the alkylene glycol is selected from ethylene glycol, butylene glycol, trimethylene glycol, propylene glycol, neopentyl glycol, hexamethylene glycol and dodecamethylene glycol.

7. The polyester fibers as claimed in claim 1, wherein the polyester polymer is selected from polyethylene terephthalate, polytrimethylene terephthalate and polytetramethylene terephthalate.

8. The polyester fibers as claimed in claim 1, wherein the polyester polymer has an intrinsic viscosity of 0.45 to 0.70, determined from a solution in orthochlorophenol at a temperature of 35° C.

9. A false twist-textured yarn comprising the polyester fibers as claimed in claim 1.

10. The false twist-textured yarn as claimed in claim 9, wherein a difference between a L* value and a b* value of the false twist-textured polyester fiber yarn is in the range of from 91.0 to 99.0.

* * * * *